Jan. 17, 1961 K. W. GOEBEL ET AL 2,968,150
JET ENGINE EXHAUST SOUND SUPPRESSOR AND THRUST REVERSER
Filed Feb. 21, 1958 3 Sheets-Sheet 1
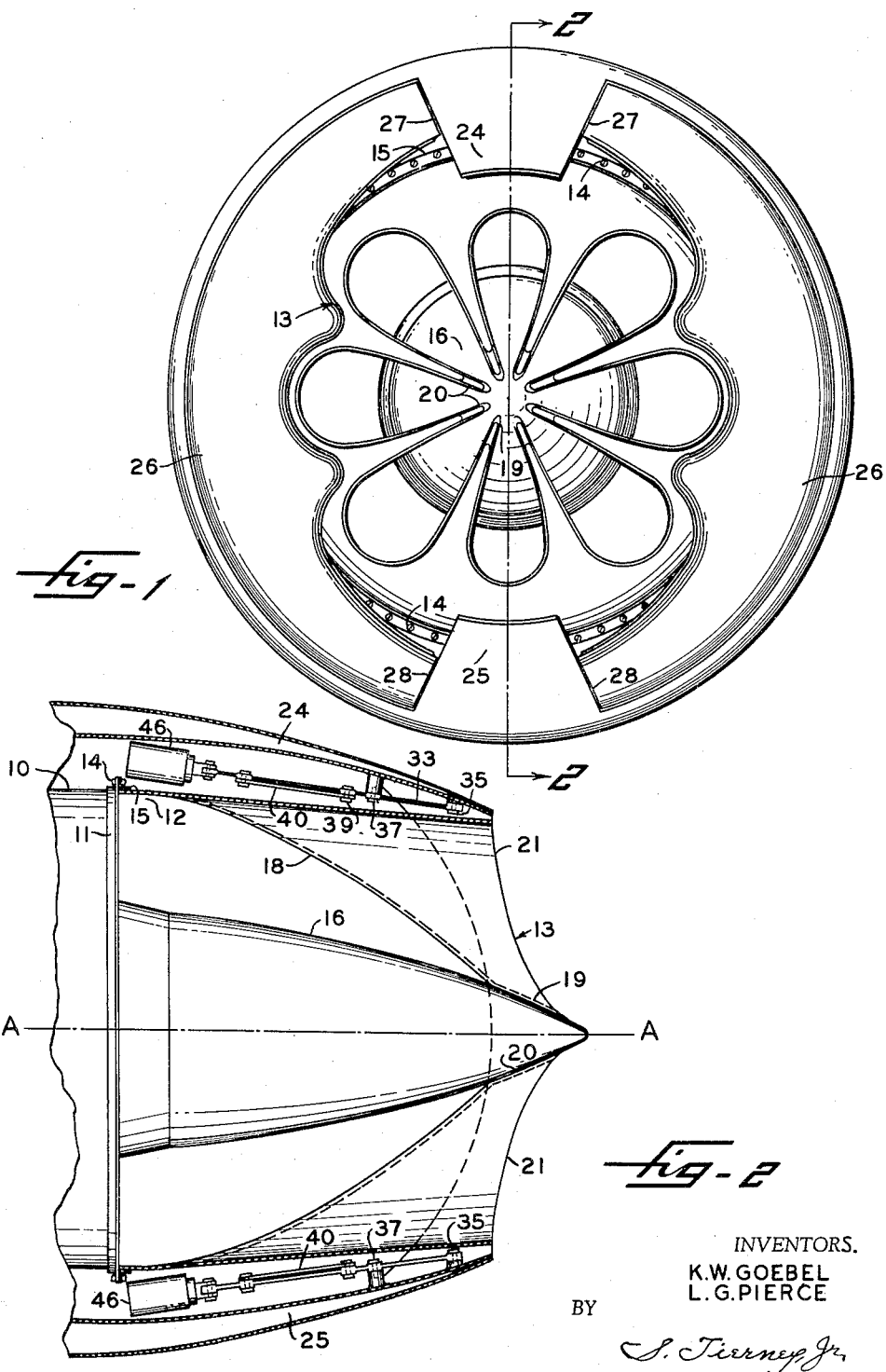
INVENTORS.
K.W. GOEBEL
L.G. PIERCE
BY
S. Tierney Jr.
ATTORNEY INVENTORS.
K.W. GOEBEL
L.G. PIERCE
BY
S. Tierney, Jr.
ATTORNEY Jan. 17, 1961 K. W. GOEBEL ET AL 2,968,150
JET ENGINE EXHAUST SOUND SUPPRESSOR AND THRUST REVERSER
Filed Feb. 21, 1958 3 Sheets-Sheet 3

INVENTORS.
K.W. GOEBEL
L.G. PIERCE
BY
S. Tierney, Jr
ATTORNEY

United States Patent Office 2,968,150
Patented Jan. 17, 1961

2,968,150

JET ENGINE EXHAUST SOUND SUPPRESSOR AND THRUST REVERSER

Kenneth W. Goebel, San Diego, and Lanvin G. Pierce, National City, Calif., assignors to Rohr Aircraft Corporation, Chula Vista, Calif., a corporation of California Filed Feb. 21, 1958, Ser. No. 716,635

8 Claims. (Cl. 60—35.55)

This invention relates to an exhaust nozzle for a reactive propulsion type engine such as a turbo-jet aircraft engine of an airplane and more particularly to a nozzle constructed to suppress the sound normally produced by the high velocity exhaust jet of such engine and to change or reverse the direction of the discharging propulsive exhaust jet to obtain a braking action.

The sound produced by the high velocity jet exhaust as it is discharged from the exhaust nozzle is of such intensity as to create a serious nuisance and hazard particularly when maximum engine thrust is required such as during the takeoff of the aircraft and while it is climbing to the desired altitude. Also, when aircraft of substantial size and weight are powered by engines of this type it is desirable that suitable means be provided for rapidly decelerating or braking its forward motion prior to landing so that it may be safely landed without requiring an excessively long runway.

It is, therefore, a primary object of this invention to provide an exhaust nozzle for a reactive propulsion type engine which will effectively diminish and suppress the sound produced by the discharging propulsive gas jet.

A further object is to provide an exhaust nozzle of the type mentioned wherein loss of thrust attributable to suppression of sound is at a minimum.

Another object is to provide an exhaust nozzle which is provided with a means for changing or reversing the direction of the discharging propulsive jet to provide a braking action.

A further important object is to provide a nozzle of the mentioned type which, when attached to an engine, will not adversely affect the aerodynamic contours of the engine thereby avoiding excessive drag during flight.

Another object is to provide an exhaust nozzle wherein the direction of the discharging propulsive jet is changed by a pair of deflecting members movable into contact with each other at the approximate center of the jet stream.

A further object is to provide an exhaust nozzle of type above mentioned which is of relatively simple and inexpensive construction and of light weight.

These and other objects and advantages of the invention will become apparent as the description thereof proceeds.

For a better understanding of the invention, reference is made to the accompanying drawing illustrating a preferred embodiment thereof and in which:

Fig. 1 is an end view of the nozzle taken from its discharge or downstream end.

Fig. 2 is a sectional view taken on line 2—2 of Fig. 1.

Figure 3:
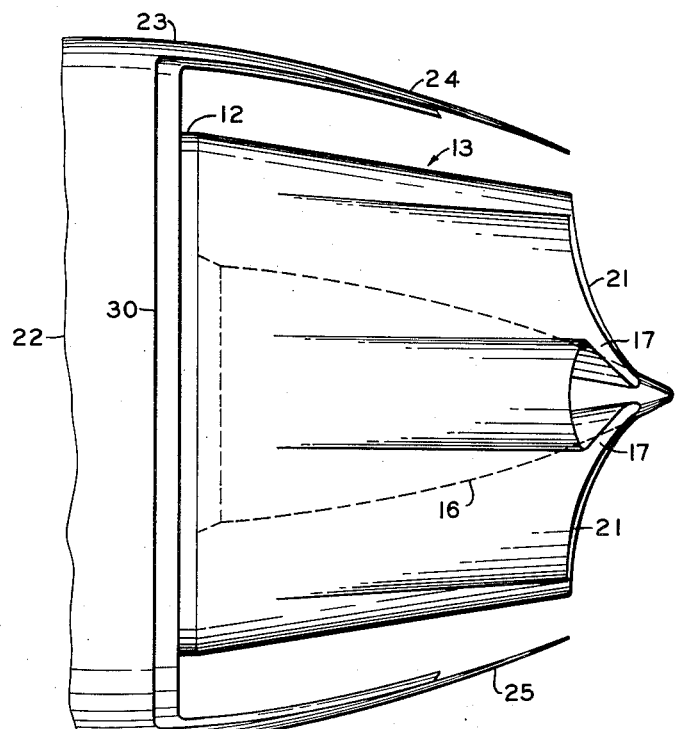
Fig. 3 is a sideview of the nozzle with the deflecting members removed to show the shape of the nozzle.

Referring to Figs. 1, 2 and 5, 10 indicates the usual cylindrical outlet tube of a gas turbine or ram jet engine (not shown) terminating in projecting flange 11. The upstream end of 12 of the nozzle 13 of this invention is also cylindrical and is secured in position by a set of bolts 14 which pass through flange 11 and through a contacting flange 15 secured to nozzle end 12. The upstream end of an innercone or exhaust plug 16 is secured by known means (not shown) within tube 10, this innercone being concentric with the axis of the tube 10 and nozzle 13 and having the generally conical shape shown. Nozzle 13 is preferably made of sheet stainless steel and is provided with a set of spaced apart corrugations or folds 17 of the shape shown, each corrugation starting at the cylindrical front portion 12 and getting progressively deeper toward the trailing end as indicated at 18, Fig. 2. The crest 19 at the aft end of each corrugation is bent to contact the periphery of innercone 16 along a region or line 20 of substantial length as shown in Fig. 2. Each crest 19 is preferably firmly attached to the surface of innercone 16 by welding or brazing extending along region 20 or other known securing means (not shown). The trailing end of the nozzle and innercone thus mutually support and reinforce each other. From Figs. 1 and 3 it is also clear that the width of each corrugation 17 progressively decreases as the axis of the nozzle and innercone 16 is approached. The result of this structure is that a stream of exhaust gas leaving tailpipe 10 in passing through nozzle 13 is broken up into a plurality of separate jetstreams having a high velocity (sonic or supersonic) and which mingle together after they reach the ambient air and thus lower the noise level. Furthermore the noise frequencies resulting from the several individual jets are higher than the frequencies obtained if all the gas issued as a single jet in the conventional manner. It will be observed in Figs. 2 and 3 that the trailing edge 21 of each corrugation is not plane but lies in a curved surface which approaches the nozzle axis A—A at a gradually decreasing acute angle. In some structures the crests 19 of the corrugations need not extend in as far as innercone 16 but may be spaced outwardly therefrom so that the gas stream is not subdivided completely into separate jets.

Figure 4:
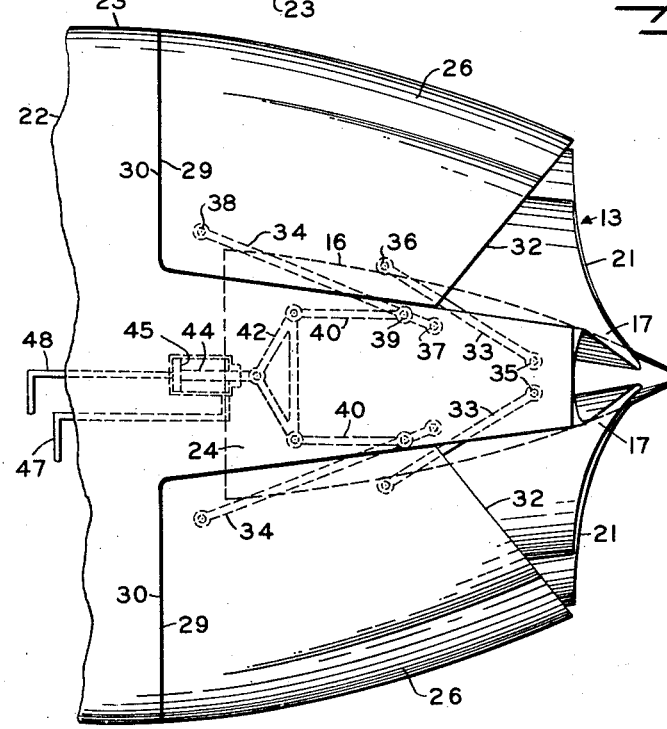
Fig. 4 is a top view of the nozzle with the mechanism for actuating the jet deflecting members shown in dotted lines.
Figure 5:
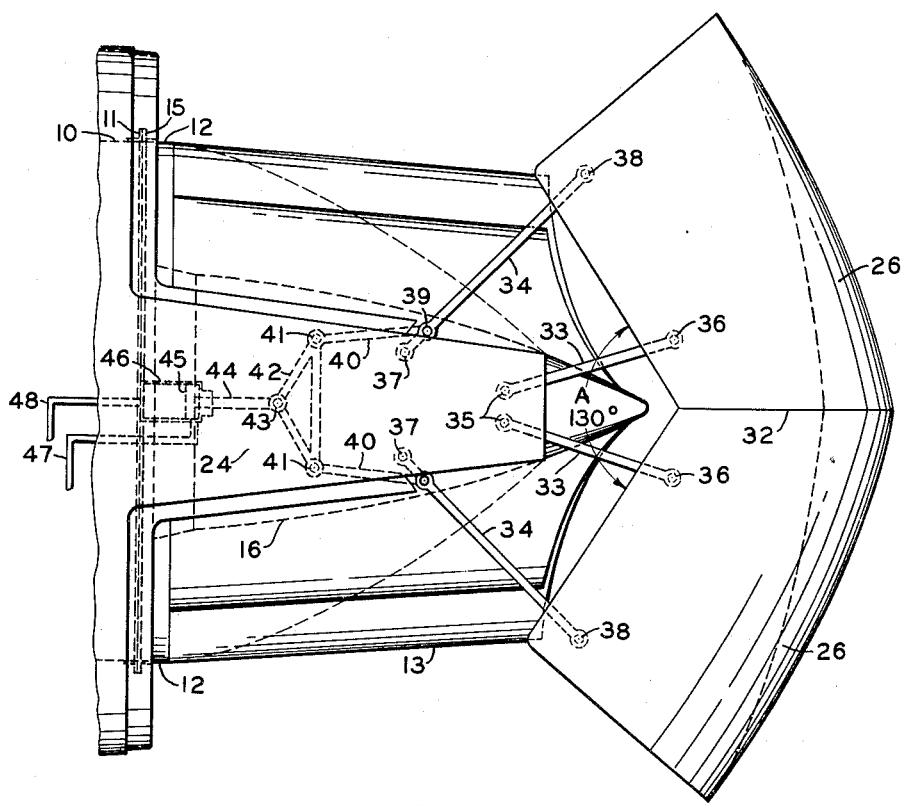
Fig. 5 is a top view of the nozzle with portions omitted to show its construction and with the jet deflecting members positioned to change the direction of the propulsive jet; and, Fig. 6 is a perspective view of one of the jet deflecting members.
Figure 6:
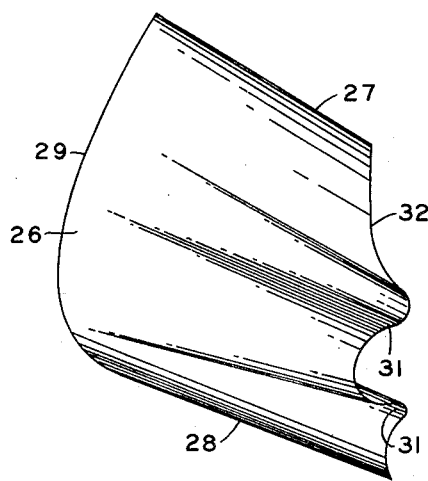

A sheet metal engine nacelle 22 surrounds tail pipe 10 and nozzle 13, the nacelle tapering in toward the aft end, as shown, to provide a good aerodynamic contour. The main body portion 23 of the nacelle has two vertically aligned curved projections 24, 25 whose width decreases in the aft direction as shown in Figs. 4 and 5. These projections serve to support a pair of similar jet stream deflectors 26 of the shape shown in Fig. 6. Each deflector has a curved upper edge 27 adapted to fit against one edge of upper projection 24 and a curved lower edge 28 adapted to fit against an edge of lower projection 25. Also the curved upstream edge 29 of the deflector is adapted to fit against the downstream edge 30 of nacelle body portion 23 as shown in Fig. 4. Each deflector has a pair of longitudinally extending corrugations 31 whose depth progressively increases downstream, portions of the corrugations 31 extending into nozzle corrugations 17 when the deflectors are in their upstream position. The trailing edges 32 of the deflectors are preferably so shaped that they abut together when the deflectors are moved aft into thrust reversal position by means to be described. The trailing edge 32 of each deflector may be of a shape different than that shown, for example, it may lie in a plane normal to the nozzle axis or may be inclined in a direction opposite to that shown in Figs. 3 and 4. Since the corrugations 31 on the deflectors extend into those on the nozzle, the base drag is greatly reduced and the aerodynamic characteristics of the airplane substantially improved.

At its top each deflector 26 is supported by a pair of levers 33, 34, the levers 33 being supported by two fixed pivots 35 secured to projection 24, the outer ends of levers 33 being connected by pivots 36 to the deflectors (see Figs. 2 and 5). Levers 34 are supported by two fixed pivots 37 secured to projection 24 and the outer ends of levers 34 are connected by pivots 38 to the deflectors. Levers 34 are connected by pivots 39 to a pair of links 40 whose front ends are connected by pivots 41 to a triangular shaped frame 42. The front end of this frame is secured at 43 to the end of piston rod 44 operated by a piston 45 slidable along the bore of cylinder 46. Pressurized fluid is supplied to the rod end of the cylinder by a pipe 47 and control valve (not shown) or to the head end of the cylinder by a pipe 48 and control valve (not shown).

A similar leverage system supports and actuates the bottom of each deflector, the various levers and links of which lie directly under those above described. In this case the fixed pivots 35 and 37 are attached to nacelle projection 25, as shown in Fig. 2. It will be understood that cylinder 46 whose piston operates the lower leverage system is also supplied with pressurized fluid by the pipes 47, 48 so that the upper and lower leverage systems are operated in synchronism to move deflectors 26 back and forth.

With piston 45 and deflectors 26 in upstream position as shown in Figs. 1, 2 and 4, full forward thrust is secured from the above described high velocity jets issuing from the nozzle. When upon landing the airplane the pilot wants to change the direction of the gas stream to cause it to exert braking action and decelerate the airplane, he opens the valve (not shown) which admits pressurized fluid to pipe 48. This causes pistons 45 to move downstream and operate the lever system described which in turn moves the deflectors 26 into the position shown in Fig. 5 with their trailing edges 32 in contact. The gas stream is now diverted in a direction both outward and upstream to reverse the direction of thrust. When the deflectors are in closed (downstream) position, the construction is such that the resultant aerodynamic forces acting against them will move them into substantially open or forward thrust position upon a failure of their actuating system or linkage.

This invention may be embodied in other forms or carried out in other ways wtihout departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. In a reactive propulsion engine for producing a high velocity gas stream, the combination of a generally cylindrical tail pipe receiving said stream; an innercone having a portion within said tail pipe and a portion projecting past the downstream end thereof, the axis of said innercone being concentric with that of said tail pipe; a long hollow nozzle abutting the downstream end of said tail pipe to convey the gas stream issuing therefrom, said innercone having the small end thereof extending past the downstream end of said nozzle, said nozzle having a plurality of spaced apart inwardly extending corrugations whose depth progressively increases toward the downstream end of the innercone and whose width progressively decreases as the periphery of the innercone is approached, regions of said corrugations at the downstream end thereof together with the periphery of said innercone forming a plurality of gas passages whereby the gas stream in passing through the nozzle is subdivided at least in part into a plurality of high velocity jets, said corrugations having radially and longitudinally extending curved trailing edges which approach the axis of the nozzle at a progressively decreasing acute angle.

2. In a reactive propulsion engine for producing a high velocity gas stream, the combination of a tail pipe receiving said stream; a long hollow nozzle abutting the downstream end of said tail pipe to convey the gas stream issuing therefrom, said nozzle having a plurality of spaced apart inwardly extending corrugations whose depth progressively increases in the downstream direction, said corrugations having radially and longitudinally extending curved trailing edges which approach the axis of the nozzle at a progressively decreasing acute angle; an innercone supported within said nozzle and concentric therewith, the small end of said innercone extending past the downstream end of the nozzle; each of said corrugations being progressively narrowed in width as the periphery of the innercone is approached and at its downstream end having a curved face in contact with and attached to the periphery of said innercone whereby the gas stream passing through the nozzle is subdivided into a plurality of separate high velocity jets and the surrounding air is drawn through said corrugations in narrowed streams for rapid intermingling with said jets.

3. The combination as claimed in claim 1, in which a hollow engine nacelle surrounds said tail pipe and is spaced outwardly therefrom, said nacelle tapering gradually inward in a downstream direction and terminating at or near the upstream ends of the trailing edges of said corrugations, said nacelle including a pair of oppositely disposed curved projections of substantial width surrounding said nozzle; a pair of oppositely disposed deflectors constructed to seat against said projections to form near portions of said nacelle and having longitudinally extending corrugations which extend into said nozzle corrugations; a plurality of levers constructed to support said deflectors and permit their movement downstream into the path of said high velocity jets to change the flow thereof toward the reverse direction; and means for actuating said levers.

4. In a reactive propulsion engine for producing a high velocity gas stream, the combination of a generally cylindrical tail pipe receiving said stream; a long hollow nozzle abutting the downstream end of said tail pipe to convey the gas issuing therefrom, said nozzle having longitudinally extending corrugations whose depth progressively increases in the downstream direction thereby to subdivide the gas stream into a central jet and a plurality of separate high velocity jets radiating from said central jet, said corrugations having radially and longitudinally extending curved trailing edges which approach the axis of the nozzle at a progressively decreasing acute angle; a hollow nacelle surrounding said tail pipe and nozzle and spaced outwardly therefrom, the transverse cross sectional area of said nacelle progressively decreasing in the downstream direction, said nacelle terminating at or near the upsteam ends of the trailing edges of said corrugations, said nacelle being provided with at least two oppositely disposed movable deflectors having longitudinally extending corrugations which extend into said nozzle corrugations, a plurality of supports connected with said nacelle and deflectors, said supports being arranged in a first position thereof to support said deflectors against the body portion of the nacelle to form a smooth continuation thereof and in a second position to support said deflectors in said high velocity jets to reverse the thrust thereof; and actuating means for moving said supports from said first position to said second position.

5. The combination as claimed in claim 4 in which long portions of the downstream edges of said deflectors abut together in response to the advancement of said supports into said second position.

6. The combination as claimed in claim 2, in which a hollow engine nacelle surrounds said tail pipe and is spaced outwardly therefrom, said nacelle tapering gradually inward in a downstream direction and terminating at or near the upstream ends of the trailing edges of said corrugations, said nacelle including a pair of oppositely disposed curved projections of substantial width surrounding said nozzle; a pair of oppositely disposed deflectors constructed to seat against said projections to form rear portions of said nacelle and having longitudinally extending corrugations which extend into said nozzle corrugations; a plurality of levers constructed to support said deflectors and permit their movement downstream into the path of said high velocity jets to change the flow thereof toward the reverse direction; and means for actuating said levers.

7. In a reactive propulsion engine carried by an airplane and having a hollow nozzle conveying the hot exhaust gas stream, an innercone supported within said nozzle concentric with the axis thereof, said nozzle having a plurality of spaced apart inwardly extending corrugations whose depth progressively increases in the downstream direction whereby the gas stream in passing through the nozzle is subdivided into a central jet and a plurality of high velocity jets radiating from said central jet, said corrugations having radially and longitudinally extending curved trailing edges which approach the axis of the nozzle at a progressively decreasing acute angle; a hollow engine nacelle surrounding said nozzle and spaced therefrom by a substantial distance, said nacelle tapering gradually inward downstream and terminating at or near the upstream ends of the trailing edges of said corrugations, said nacelle having a pair of oppositely disposed movable deflector portions having corrugations which extend into said nozzle corrugations; means pivotally supporting said deflectors for downstream movement into the gas stream to change the flow thereof toward the reverse direction; and actuating means for moving said deflectors from upstream to downstream positions, said deflector supporting means being constructed to permit their free movement from downstream to upstream position in case of failure of said actuating means.

8. In a reactive propulsion engine carried by an airplane and having a hollow nozzle conveying the hot exhaust gas stream, an innercone supported within said nozzle concentric with the axis thereof, said nozzle having a plurality of spaced apart inwardly extending corrugations whose depth progressively increases in the downstream direction whereby the gas stream in passing through the nozzle is subdivided into a plurality of high velocity jets, said corrugations having radially and longitudinally extending curved trailing edges which approach the axis of the nozzle at a progressively decreasing acute angle; a hollow engine nacelle surrounding said nozzle and spaced therefrom by a substantial distance, said nacelle tapering gradually inward downstream and terminating at or near the upstream ends of the trailing edges of said corrugations, said nacelle having a plurality of movable deflector portions, each deflector having one or more inwardly extending corrugations whose depth progressively increases in the downstream direction, the corrugations of said deflectors extending into the corrugations of said nozzle when said deflectors are in their upstream position; means pivotally supporting said deflectors for downstream movement into the gas stream to change the flow thereof toward the reverse direction; and actuating means for moving said deflectors about their pivotal supports.

References Cited in the file of this patent
UNITED STATES PATENTS

| | | |
|---|---|---|
| 157,548 | Shaw | Dec. 8, 1874 |
| 2,382,386 | Arms | Aug. 14, 1945 |
| 2,396,068 | Youngash | Mar. 5, 1946 |
| 2,397,556 | Magill | Apr. 2, 1946 |
| 2,426,833 | Lloyd | Sept. 2, 1947 |
| 2,620,622 | Lundberg | Dec. 9, 1952 |
| 2,664,700 | Benoit | Jan. 5, 1954 |
| 2,839,891 | Drakeley | June 24, 1958 |
| 2,847,822 | Hausmann | Aug. 19, 1958 |
| 2,847,823 | Brewer | Aug. 19, 1958 |

FOREIGN PATENTS

| | | |
|---|---|---|
| 165,369 | Australia | Sept. 26, 1955 |
| 778,008 | Great Britain | July 3, 1957 |

OTHER REFERENCES

Greatrex: Flight Magazine, vol. 68, No. 2424, pages 57–60, "Reduction of Jet Noise," July 8, 1955.

Withington: Aviation Age Magazine, vol. 25, No. 4, pages 48–53, "Jet Noise Can Be Cut," April 1956.